United States Patent
Ukegawa et al.

(10) Patent No.: US 10,132,693 B2
(45) Date of Patent: *Nov. 20, 2018

(54) SOLDER DEGRADATION INFORMATION GENERATION APPARATUS

(71) Applicant: TOYOTA JIDOSHA KABUSHIKI KAISHA, Toyota-shi, Aichi-ken (JP)

(72) Inventors: Hiroshi Ukegawa, Toyota (JP); Yukio Onishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 362 days.

This patent is subject to a terminal disclaimer.

(21) Appl. No.: 14/941,115

(22) Filed: Nov. 13, 2015

(65) Prior Publication Data

US 2016/0146676 A1 May 26, 2016

(30) Foreign Application Priority Data

Nov. 21, 2014 (JP) .................................. 2014-237004

(51) Int. Cl.
  *G01K 7/01* (2006.01)
  *G01K 3/10* (2006.01)
(52) U.S. Cl.
  CPC .......... *G01K 3/10* (2013.01); *G01K 2205/00* (2013.01)
(58) Field of Classification Search
  CPC combination set(s) only.
  See application file for complete search history.

(56) References Cited

U.S. PATENT DOCUMENTS

| 2004/0150377 A1 | 8/2004 | Elek et al. |
| 2006/0126253 A1 | 6/2006 | Urakabe et al. |
| 2006/0164867 A1 | 7/2006 | Dikken et al. |
| 2009/0160476 A1* | 6/2009 | Omaru .................. H02H 7/1225 324/764.01 |
| 2012/0075761 A1 | 3/2012 | Miura et al. |

(Continued)

FOREIGN PATENT DOCUMENTS

| JP | 2002-005989 A | 1/2002 |
| JP | 2009-019953 A | 1/2009 |

(Continued)

OTHER PUBLICATIONS

English Translation of JP2002005989 by EPO.*

(Continued)

*Primary Examiner* — Lisa Caputo
*Assistant Examiner* — Nasir U Ahmed
(74) *Attorney, Agent, or Firm* — Oliff PLC

(57) ABSTRACT

A solder degradation information generation apparatus related to a motor drive circuit that includes a power supply, a converter, a smoothing capacitor, and an electric motor is disclosed. The solder degradation information generation apparatus includes a semiconductor element that forms an upper arm of the converter and is bonded to a substrate via a solder, the substrate being cooled by a coolant, a measuring unit configured to measure a temperature of the semiconductor element and a processing device that generates information indicating a degradation state of the solder based on a measurement result of the measuring unit that is obtained during a period in which the smoothing capacitor is charged.

6 Claims, 9 Drawing Sheets

(56) References Cited

U.S. PATENT DOCUMENTS

| | | |
|---|---|---|
| 2012/0119574 A1 | 5/2012 | Sone et al. |
| 2012/0229061 A1 | 9/2012 | Itoh et al. |
| 2013/0026841 A1 | 1/2013 | Hosini et al. |
| 2014/0218833 A1 | 8/2014 | Wu et al. |

FOREIGN PATENT DOCUMENTS

| | | |
|---|---|---|
| JP | 2009-261227 A | 11/2009 |
| JP | 2010-136472 A | 6/2010 |
| JP | 2010-246246 A | 10/2010 |
| JP | 2012-110071 A | 6/2012 |
| JP | 2012-210138 A | 10/2012 |
| JP | 2012-235081 A | 11/2012 |
| JP | 2013-146130 A | 7/2013 |
| JP | 2013-242110 A | 12/2013 |
| JP | 2014-147206 A | 8/2014 |

OTHER PUBLICATIONS

English Translation of JP20100136472 by EPO.*
U.S. Appl. No. 14/726,973, filed Jun. 1, 2015 in the name of Onishi et al.
Apr. 7, 2017 Office Action issued in U.S. Appl. No. 14/726,973.
Aug. 2, 2017 Notice of Allowance issued in U.S. Appl. No. 14/726,973.

* cited by examiner

US 10,132,693 B2

SOLDER DEGRADATION INFORMATION GENERATION APPARATUS

FIELD

The present invention is related to a solder degradation information generation apparatus.

BACKGROUND

Japanese Laid-open Patent Publication No. 2009-19953 (referred to as "Patent Document 1", hereinafter) discloses a technique for detecting a degradation of a solder bonding portion by simultaneously applying a life measuring pulse of about 10 micro millimeter second to IGBTs (Insulated Gate Bipolar Transistor) on upper and lower sides to cause a short circuit current to be generated.

However, according to a configuration disclosed in Patent Document 1, a circuit formed when the IGBTs on upper and lower sides are turned on simultaneously has a substantially low impedance, which may lead to a problem in that a substantially large short circuit current is generated instantaneously when the IGBTs on upper and lower sides are turned on simultaneously.

Therefore, an object of the present invention is provide a solder degradation information generation apparatus that can generate information indicating a degradation state of a solder without generating a short circuit current.

SUMMARY

According to the present invention, a solder degradation information generation apparatus related to a motor drive circuit that includes a power supply, a converter, a smoothing capacitor, and an electric motor is provided, the solder degradation information generation apparatus includes:

a semiconductor element that forms an upper arm of the converter and is bonded to a substrate via a solder, the substrate being cooled by a coolant;

a measuring unit configured to measure a temperature of the semiconductor element; and a processing device that generates information indicating a degradation state of the solder based on a measurement result of the measuring unit that is obtained during a period in which the smoothing capacitor is charged.

DESCRIPTION OF EMBODIMENTS

In the following, embodiments will be described with reference to the accompanying drawings.

Figure 1:
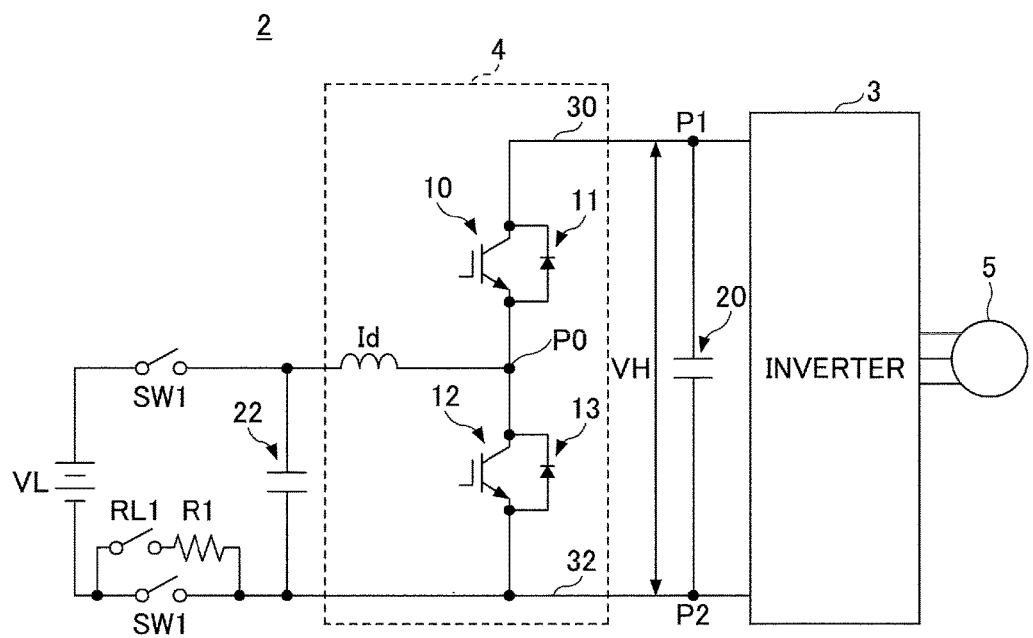
FIG. 1 is a diagram illustrating an example a motor drive circuit related to a solder degradation information generation apparatus according to a first embodiment of the present invention.
Figure 2:
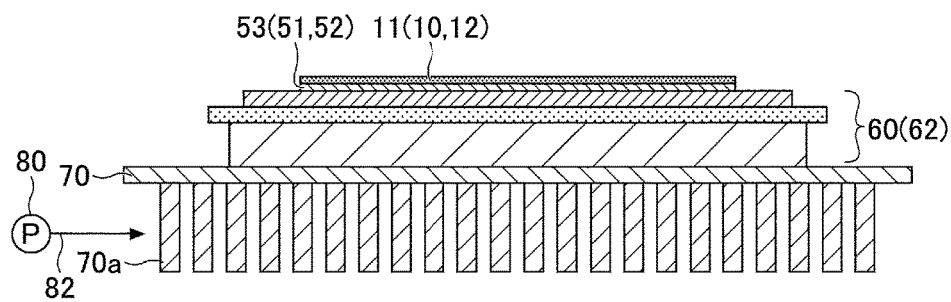
FIG. 2 is a diagram illustrating an example of an installed state of a free wheeling diode 11.

FIG. 1 is a diagram illustrating an example a motor drive circuit 2 related to a solder degradation information generation apparatus according to a first embodiment of the present invention. FIG. 2 is a diagram illustrating an example of an installed state of a free wheeling diode 11. It is noted that, in FIG. 2, referential numerals in brackets indicate components related to a first switching element 10 and a second switching element 12 other than the free wheeling diode 11.

The motor drive circuit 2 is used for a hybrid vehicle or an electric vehicle.

The motor drive circuit 2 includes a direct-current power supply VL, an inverter 3, a converter 4, a smoothing capacitor 20, a filter capacitor 22 and an electric motor 5.

The first switching element 10 and the second switching element 12 form the converter 4 together with an inductor Id that is coupled to a midpoint P0 between the first switching element 10 and the second switching element 12 to perform a stepping-up and stepping-down operations. The inverter 3 is coupled to the electric motor 5.

The first switching element 10 is an IGBT (Insulated Gate Bipolar Transistor) in this example. It is noted that the first switching element 10 may be another switching element, instead of IGBT, such as a MOSFET (metal oxide semiconductor field-effect transistor), etc. The first switching element 10 is coupled to the free wheeling diode 11 (an example of a first semiconductor element) in parallel, as illustrated in FIG. 1.

The free wheeling diode 11 is installed on a first substrate 60 via a solder 53, as illustrated in FIG. 2. The first substrate 60 is bonded to a heat sink 70. The heat sink 70 includes a lower side (an opposite side with respect to the first substrate 60) that contacts a first coolant. A lower side surface of the heat sink 70 may include fins 70a formed therein. It is noted that, in the example illustrated in FIG. 2, the first substrate 60 includes three layers in which aluminum plates are provided on opposite sides of a ceramic substrate such as aluminum nitride, etc. Alternatively, the first substrate 60 may include copper plates on the opposite sides of the ceramic substrate, or may be formed by a single copper plate (i.e., a heat spreader). In the case where the first substrate 60 includes only the copper plate, the first substrate 60 is bonded to the heat sink 70 via an insulating layer such as an insulation film, etc.

It is noted that, in FIG. 2, a pump 80 for supplying the first coolant is schematically illustrated at a coolant channel formed on the lower side of the heat sink 70. The heat sink 70 forms a flow (a circulation) of the coolant through the fins 70a of the heat sink 70 via a supply channel 82. The first coolant is arbitrary, and may be air, or a liquid such as a LLC (Long Life Coolant).

Although the illustration is omitted, the first switching element 10 is installed on the first substrate 60 via a first solder 51 (see FIG. 2), as is the case with the free wheeling diode 11. The first switching element 10 and the free wheeling diode 11 may be formed by a single chip as an RC-IGBT (Reverse Conducting-Insulated Gate Bipolar Transistor). In this case, the RC-IGBT (another example of a first semiconductor element) is bonded to the first substrate 60 via the solder 53.

Although the illustration is omitted, the second switching element 12 (an example of a second semiconductor element) is installed on a second substrate 62 via a second solder 52 (see FIG. 2), as is the case with the free wheeling diode 11. The second switching element 12 is an IGBT, in this example. The second switching element 12 is coupled to a free wheeling diode 13 in parallel, as illustrated in FIG. 1. The second substrate 62 on which the second switching element 12 is installed is different from the first substrate 60 on which the first switching element 10 is installed and electrically insulated from the first substrate 60. The second substrate 62 on which the second switching element 12 is installed is cooled by a second coolant. The second coolant may be the same as the first coolant (i.e., a coolant shared between the upper and lower arms) or may be different from the first coolant (i.e., the second coolant flows through a coolant channel different from the first coolant channel).

Although the illustration is omitted, the free wheeling diode 13 is installed on the substrate, as is the case with the free wheeling diode 11. The substrate on which the free wheeling diode 13 is installed may be the same as the second substrate 62 on which the second switching element 12 is installed. The second switching element 12 and the free wheeling diode 13 may be formed by a single chip as the RC-IGBT.

The smoothing capacitor 20 is provided in parallel with respect to the first switching element 10 and the second switching element 12 between a positive pole line 30 and a negative pole line 32.

The filter capacitor 22 is provided in parallel with respect to the second switching element 12 between a positive pole and a negative pole of the direct-current power supply VL. A main switch SW1 is provided between the direct-current power supply VL and the filter capacitor 22. The main switch SW1 includes a relay. The main switch SW1 may include a limitation resistor R1 and a pre-charge relay RL1 in parallel. It is noted that, in the example illustrated in FIG. 1, the main switches SW1 are provided on the opposite sides of the direct-current power supply VL; however, one of the main switches SW1 may be omitted.

Figure 3:
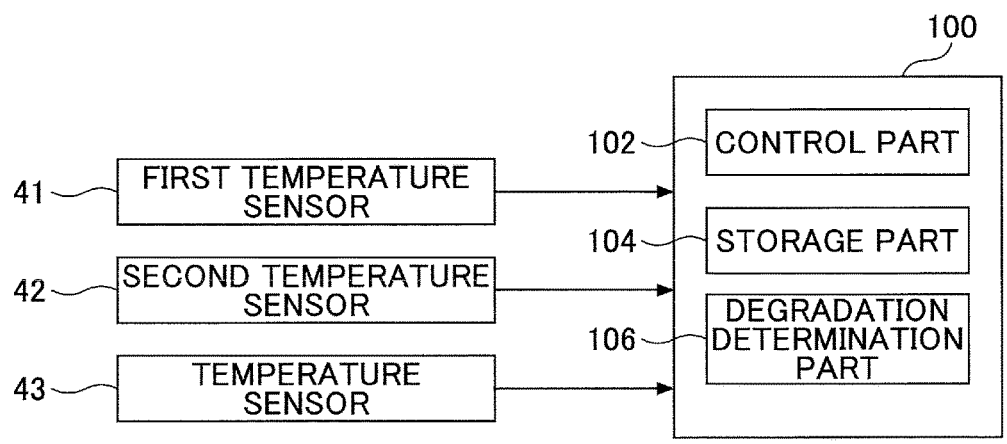
FIG. 3 is a diagram illustrating a configuration of an information processing system related to the solder degradation information generation apparatus according to a second embodiment.

FIG. 3 is a diagram illustrating a configuration of an information processing system related to the solder degradation information generation apparatus.

The solder degradation information generation apparatus 1 includes a processing device 100, a first temperature sensor 41, a second temperature sensor 42, and a temperature sensor 43.

The processing device 100 includes a computer.

The first temperature sensor 41 (an example of a first measuring unit) measures a temperature of the first switching element 10. The first temperature sensor 41 may be incorporated in a chip that includes the first switching element 10.

The second temperature sensor 42 (an example of a second measuring unit) measures a temperature of the second switching element 12. The second temperature sensor 42 may be incorporated in a chip that includes the second switching element 12.

The temperature sensor 43 (an example of a measuring unit) measures a temperature of the free wheeling diode 11. It is noted that, in the case where the first switching element 10 and the free wheeling diode 11 are formed by a single chip as the RC-IGBT, the temperature sensor 43 may measures the temperature of the first switching element 10. In this case, the first temperature sensor 41 or the temperature sensor 43 can be omitted.

The processing device 100 includes a control part 102, a storage part 104, and a degradation determination part 106.

The control part 102 controls the converter 4 by applying pulses to respective gates of the first switching element 10 and the second switching element 12. Further, the control part 102 controls the main switch SW1 (FIG. 1).

The storage part 104 stores measurement results of the first temperature sensor 41, the second temperature sensor 42 and the temperature sensor 43 (also simply referred to as "temperature sensors 41 through 43", hereinafter).

The degradation determination part 106 outputs information indicating degradation states of the first solder 51, the second solder 52 and the solder 53 (also simply referred to as "solders", hereinafter) based on change manners of the measured values of the temperature sensors 41 through 43. The information indicating the degradation states of the solders directly or indirectly represent the degradation states of the solders.

Figure 4:
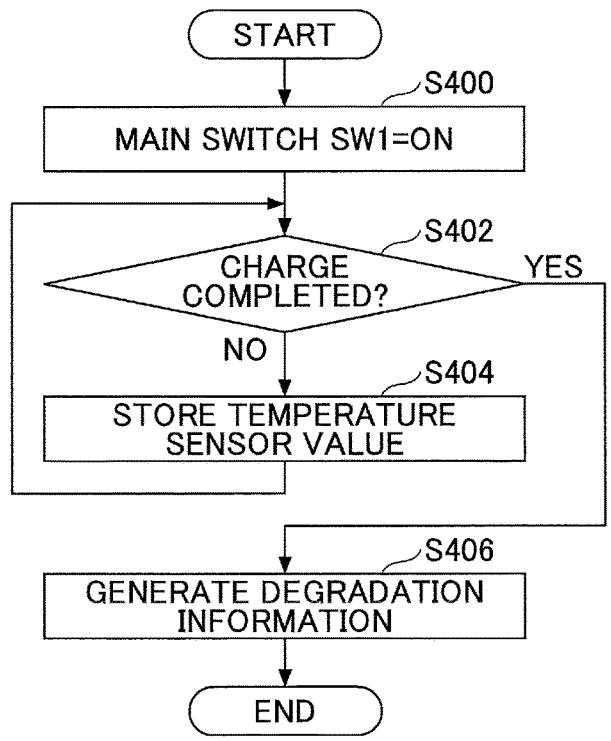
FIG. 4 is an example of a flowchart of a solder degradation determination process executed by a processing device 100.

FIG. 4 is an example of a flowchart of a solder degradation determination process executed by the processing device 100.

In step S400, the control part 102 turns on the main switch SW1. When the main switch SW1 is turned on, the system related to the motor drive circuit 2 is started up. When the main switch SW1 is turned on, the current flows as an arrow I1 schematically illustrated in FIG. 5, which increases a voltage (i.e., a potential difference between P1 and P2) across the smoothing capacitor 20 (i.e., the smoothing capacitor 20 is pre-charged). Accordingly, a loss is generated at the free wheeling diode 11, which increases the temperature of the free wheeling diode 11.

In step S402, the control part 102 determines whether the charging (pre-charging) of the smoothing capacitor 20 is completed. The control part 102 may determine that charging of the smoothing capacitor 20 is completed after a lapse of a predetermined time from the timing of starting the pre-charge. Alternatively, the control part 102 may determine that charging of the smoothing capacitor 20 is completed when the voltage across the smoothing capacitor 20 becomes greater than or equal to a predetermined threshold. If it is determined that the charging (pre-charging) of the smoothing capacitor 20 is completed, the process routine goes to step S406, otherwise process routine goes to step S404.

In step S404, the control part 102 stores the measured value of the temperature sensor 43 at that time in the storage part 104. When the control part 102 completes the process of step S404, the control part 102 performs the processes from step S402 after a lapse of a predetermined time again.

In step S406, the degradation determination part 106 generates, based on the measurement result of the temperature sensor 43 (i.e., the measurement result of the temperature sensor 43 during the charging of the smoothing capacitor 20) stored in the storage part 104, the information indicating the degradation state of the solder 53 immediately below the free wheeling diode 11. For example, the degradation determination part 106 determines the degradation state of the solder 53 based on the measurement result of the temperature sensor 43 during the charging of the smoothing capacitor 20, and generates information representing a determination result. For example, the degradation determination part 106 determines whether an increased amount of the measured value of the temperature sensor 43 (i.e., an increased amount of the temperature of the free wheeling diode 11) during the charging of the smoothing capacitor 20 is greater than or equal to a predetermined threshold Tth. In this case, when the increased amount of the measured value of the temperature sensor 43 during the charging of the smoothing capacitor 20 is greater than or equal to the predetermined threshold Tth, the degradation determination part 106 may determine that there is a degradation, otherwise the degradation determination part 106 may determine that there is no degradation. The degradation determination part 106 may call attention to a user by turning on an alert indicator, etc., when the degradation determination part 106 determines that there is a degradation.

Figure 6:
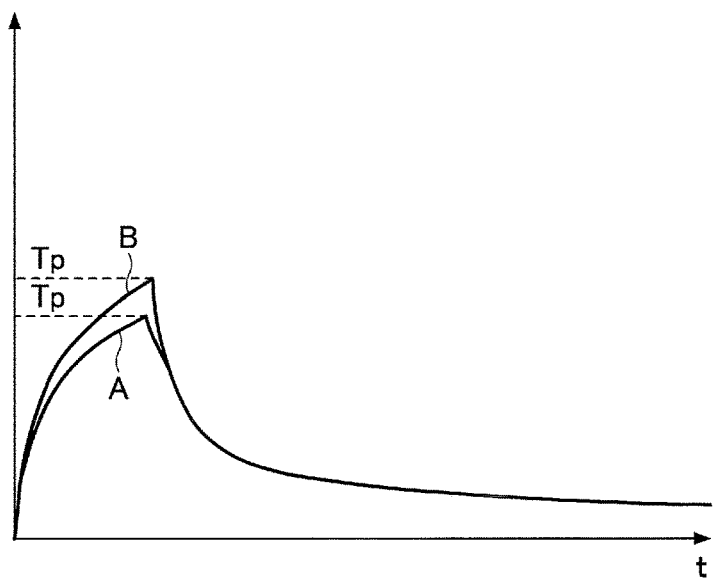
FIG. 6 is a diagram illustrating heating/radiating characteristics.

FIG. 6 is a diagram illustrating heating/radiating characteristic curves that are obtained as the measurement result of the temperature sensor 43 during the charging of the smoothing capacitor 20. In step S406, the degradation determination part 106 may determine the degradation state of the solder 53 based on the heating/radiating characteristic curve to output the determination result.

In FIG. 6, a curve "A" indicates a case where there is no degradation in the solder 53 (i.e., a conforming item), and a curve "B" indicates a case where there is a degradation in the solder 53 (i.e., a degraded item). As illustrated in FIG. 6, a peak temperature Tp in the state in which the solder 53 is degraded becomes higher than that in the state in which the solder 53 is not degraded. This is because transmission of the heat to the first substrate 60 is limited by the degradation of the solder 53. Thus, the degradation determination part 106 of the processing device 100 may determine the degradation state of the solder 53 based on the peak temperature Tp obtained from the heating/radiating characteristic curve.

It is noted that the determination result of the degradation state of the solder 53 may be output in a binary manner (i.e., simply whether there is a degradation or not) or may be output in three or more steps. Further, the degradation determination part 106 of the processing device 100 may output a numeral itself between the peak temperatures Tp (i.e., the difference with respect to the confirming item) as the determination result of the degradation state of the solder 53. Alternatively, the degradation determination part 106 may output the heating/radiating characteristic curve itself. It is noted that element on which the information is output may be a display installed on the vehicle, a terminal used at a dealer, an external server, etc. In this case, an inspector of the dealer, for example, may determine the degradation state of the solder 53 by checking such numeral or the heating/radiating characteristic curve.

Figure 5:
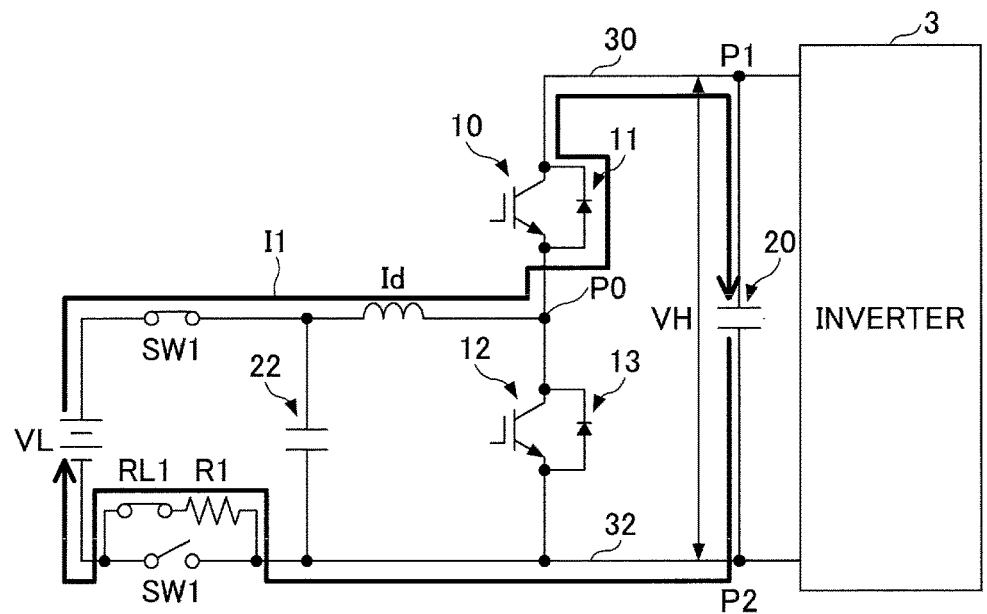
FIG. 5 is a diagram schematically illustrating flow of a current at a time of pre-charging.

According to the process illustrated in FIG. 4, the degradation determination part 106 can generate, based on the measurement result of the temperature sensor 43 during the charging of the smoothing capacitor 20, the information indicating the degradation state of the solder 53 immediately below the free wheeling diode 11. Thus, the degradation determination part 106 can generate the information indicating the degradation state of the solder 53 by effectively utilizing an operation (i.e, the pre-charge operation) at the time of stating up the system related to the motor drive circuit 2. Thus, the degradation determination part 106 can effectively generate the information indicating the degradation state of the solder 53 by utilizing an ordinary operation of the system related to the motor drive circuit 2. Further, the current flowing through the free wheeling diode 11 during the charging of the smoothing capacitor 20 does not take an instantaneous large value, because there is the limitation resistor R1 in the circuit as illustrated in FIG. 5 (i.e., because a low impedance is prevented). Therefore, a probability of a failure of the free wheeling diode 11 due to the current at the time of determining the degradation can be reduced. It is noted that, even in a configuration in which there is no limitation resistor R1, the current flowing through the free wheeling diode 11 during the charging of the smoothing capacitor 20 does not take an instantaneous large value, because there is the inductance Id in the circuit. Thus, even in the configuration in which there is no limitation resistor R1, the probability of the failure of the free wheeling diode 11 due to the current at the time of determining the degradation can be reduced.

It is noted that, in the process illustrated in FIG. 4, the degradation determination part 106 generates the information indicating the degradation state of the solder 53 based on the measurement result of the temperature sensor 43 obtained over a whole charge period of the smoothing capacitor 20; however, this is not indispensable. For example, the degradation determination part 106 may generate the information indicating the degradation state of the solder 53 based on the measurement result of the temperature sensor 43 obtained over a part of the whole charge period of the smoothing capacitor 20 or at a predetermined timing (the peak value of the temperature sensor 43, for example) during the charge period.

Figure 7:
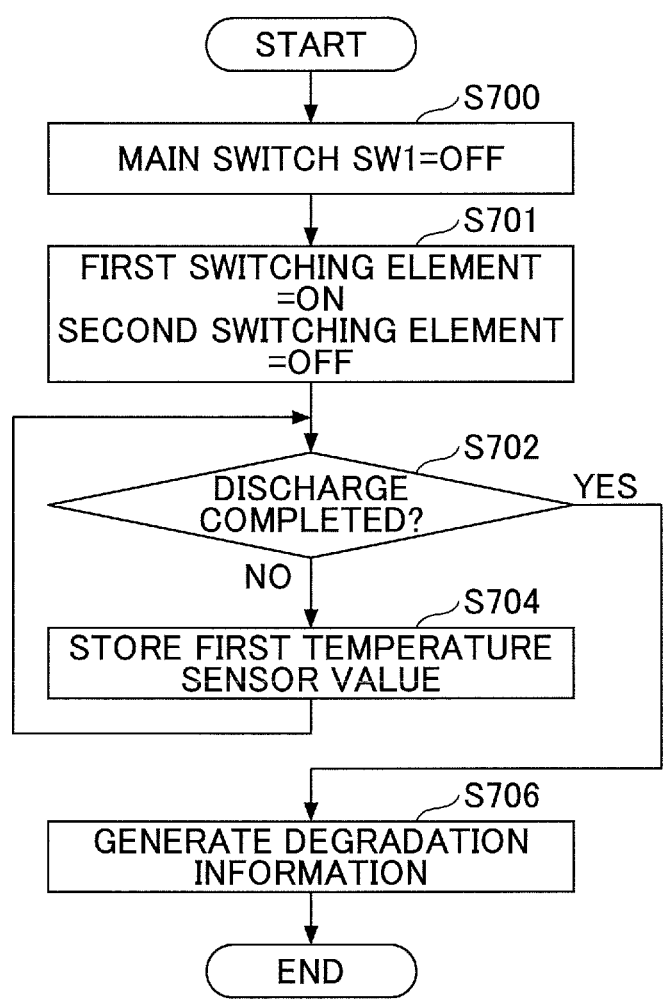
FIG. 7 is another example of a flowchart of a solder degradation determination process executed by a processing device 100.

FIG. 7 is another example of a flowchart of the solder degradation determination process executed by the processing device 100.

In step S700, the control part 102 turns off the main switch SW1. When the main switch SW1 is turned off, the system related to the motor drive circuit 2 is stopped.

In step S701, the control part 102 turns on the first switching element 10 and turns off the second switching element 12. As a result of this, the current flows as schematically illustrated by an arrow I2 in FIG. 8, which causes electric charges accumulated in the smoothing capacitor 20 to move to the filter capacitor 22. In other words, a voltage across the filter capacitor 22 increases (i.e., the smoothing capacitor 20 is discharged). Accordingly, the loss is generated at the first switching element 10, which increases the temperature of the first switching element 10.

In step S702, the control part 102 determines whether the discharging of the smoothing capacitor 20 is completed. The control part 102 may determine that discharging of the smoothing capacitor 20 is completed after a lapse of a predetermined time from the timing of starting the discharge. Alternatively, the control part 102 may determine that discharging of the smoothing capacitor 20 is completed when the voltage across the filter capacitor 22 becomes greater than or equal to a predetermined threshold. Alternatively, the control part 102 may determine that discharging of the smoothing capacitor 20 is completed when the voltage across the smoothing capacitor 20 becomes less than or equal to a predetermined threshold. If it is determined that the discharging of the smoothing capacitor 20 is completed, the process routine goes to step S706, otherwise process routine goes to step S704. It is noted that, if it is determined that the discharging of the smoothing capacitor 20 is completed, the control part 102 may turn off the first switching element 10.

In step S704, the control part 102 stores the measured value of the first temperature sensor 41 at that time in the storage part 104. When the control part 102 completes the process of step S704, the control part 102 performs the processes from step S702 after a lapse of a predetermined time again.

In step S706, the degradation determination part 106 generates, based on the measurement result of the first temperature sensor (i.e., the measurement result of the first temperature sensor 41 during the discharging of the smoothing capacitor 20) stored in the storage part 104, the information indicating the degradation state of the first solder 51 immediately below the first switching element 10. The process itself may be the same as the process in step S406 described above except that the measurement result of the first temperature sensor 41 is used and the degradation state of the first solder 51 is determined.

Figure 8:
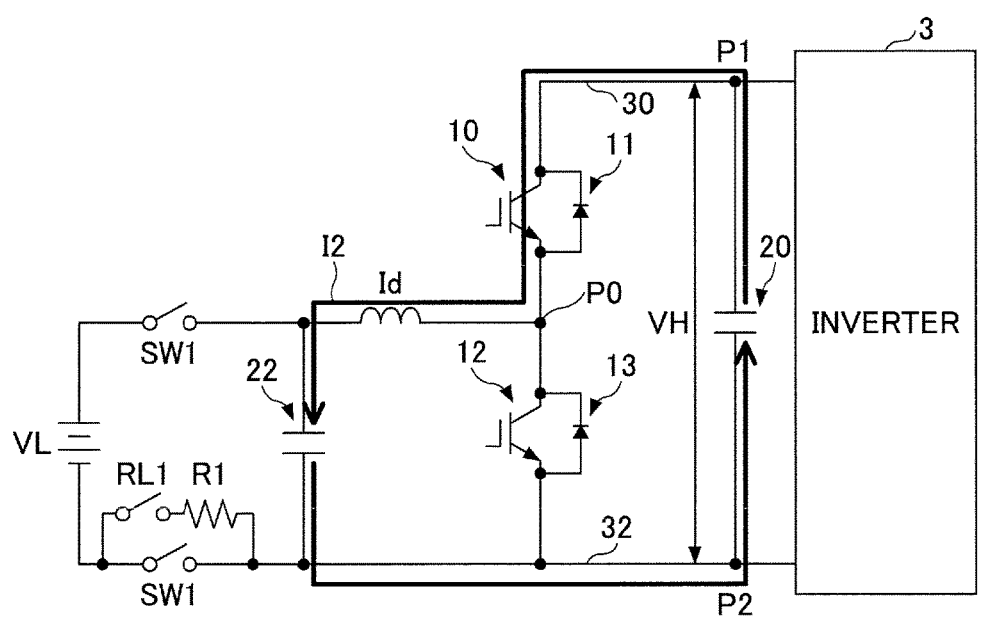
FIG. 8 is a diagram schematically illustrating flow of a current at a time of discharging a smoothing capacitor 20.

According to the process illustrated in FIG. 7, the degradation determination part 106 can generate, based on the measurement result of the first temperature sensor 41 during the discharging of the smoothing capacitor 20, the information indicating the degradation state of the first solder 51 immediately below the first switching element 10. Thus, the degradation determination part 106 can effectively generate the information indicating the degradation state of the first solder 51 by utilizing a discharge operation that is generally performed at the time of stopping the system related to the motor drive circuit 2. Further, the current flowing through the first switching element 10 during the discharging of the smoothing capacitor 20 does not take an instantaneous large value, because there is the inductance Id in the circuit as illustrated in FIG. 8 (i.e., because a low impedance is prevented). Therefore, a probability of a failure of the first switching element 10 due to the current at the time of determining the degradation can be reduced.

It is noted that, in the process illustrated in FIG. 7, the degradation determination part 106 generates the information indicating the degradation state of the first solder 51 based on the measurement result of the first temperature sensor 41 obtained over a whole discharge period of the smoothing capacitor 20; however, this is not indispensable. For example, the degradation determination part 106 may generate the information indicating the degradation state of the first solder 51 based on the measurement result of the first temperature sensor 41 obtained over a part of the whole discharge period of the smoothing capacitor 20 or at a predetermined timing during the discharge period.

Figure 9:
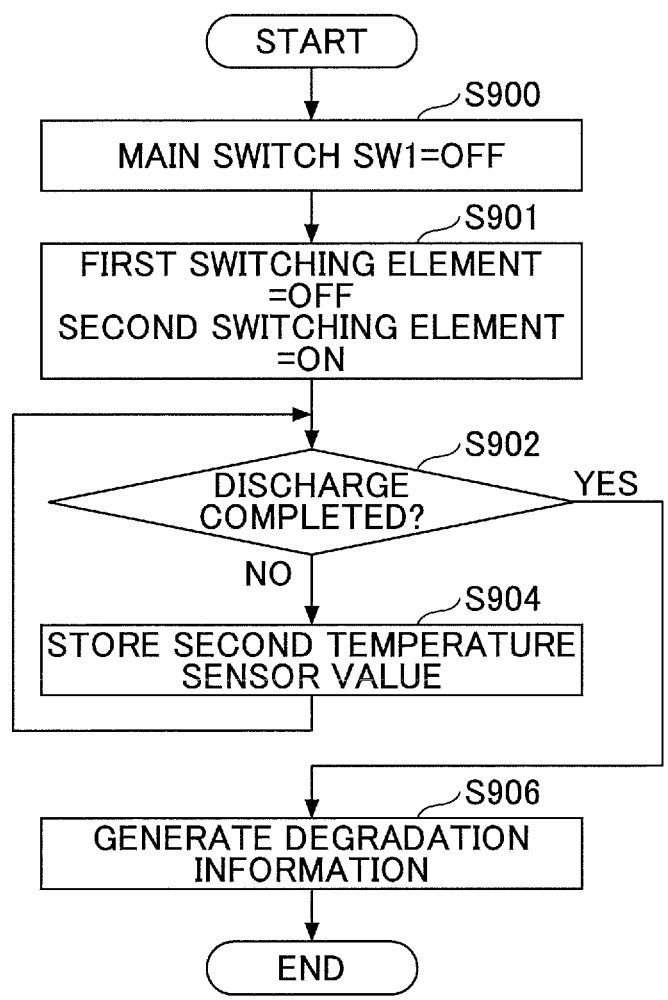
FIG. 9 is another example of a flowchart of a solder degradation determination process executed by the processing device 100.

FIG. 9 is another example of a flowchart of the solder degradation determination process executed by the processing device 100.

In step S900, the control part 102 turns off the main switch SW1. When the main switch SW1 is turned off, the system related to the motor drive circuit 2 is stopped.

In step S901, the control part 102 turns off the first switching element 10 and turns on the second switching element 12. As a result of this, the current flows as schematically illustrated by an arrow I3 in FIG. 10, which causes electric charges accumulated in the filter capacitor 22 to move to ground. In other words, the filter capacitor 22 is discharged. Accordingly, the loss is generated at the second switching element 12, which increases the temperature of the second switching element 12.

In step S902, the control part 102 determines whether the discharging of the filter capacitor 22 is completed. The control part 102 may determine that discharging of the filter capacitor is completed after a lapse of a predetermined time from the timing of starting the discharge. Alternatively, the control part 102 may determine that discharging of the filter capacitor 22 is completed when the voltage across the filter capacitor 22 becomes less than or equal to a predetermined threshold. If it is determined that the discharging of the filter capacitor 22 is completed, the process routine goes to step S906, otherwise process routine goes to step S904. It is noted that, if it is determined that the discharging of the filter capacitor 22 is completed, the control part 102 may turn off the second switching element 12.

In step S904, the control part 102 stores the measured value of the second temperature sensor 42 at that time in the storage part 104. When the control part 102 completes the process of step S904, the control part 102 performs the processes from step S902 after a lapse of a predetermined time again.

In step S906, the degradation determination part 106, based on the measurement result of the second temperature sensor 42 (i.e., the measurement result of the second temperature sensor 42 during the discharging of the filter capacitor 22) stored in the storage part 104, the information indicating the degradation state of the second solder 52 immediately below the second switching element 12. The process itself may be the same as the process in step S406 described above except for that the measurement result of the second temperature sensor 42 is used and the degradation state of the second solder 52 is determined.

Figure 10:
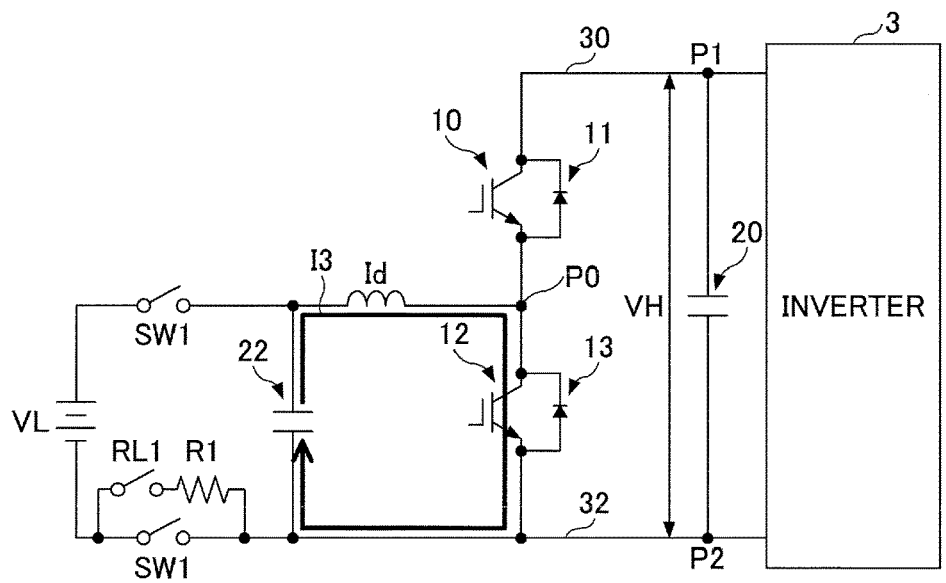
FIG. 10 is a diagram schematically illustrating flow of a current at a time of discharging a filter capacitor 22.

According to the process illustrated in FIG. 9, the degradation determination part 106 can generate, based on the measurement result of the second temperature sensor 42 during the discharging of the filter capacitor 22, the information indicating the degradation state of the second solder 52 immediately below the second switching element 12. Thus, the degradation determination part 106 can effectively generate the information indicating the degradation state of the second solder 52 by utilizing a discharge operation that is generally performed at the time of stopping the system related to the motor drive circuit 2. Further, the current through the second switching element 12 during the discharging of the filter capacitor 22 does not take an instantaneous large value, because there is the inductance Id in the circuit as illustrated in FIG. 10 (i.e., because a low impedance is prevented). Therefore, a probability of a failure of the second switching element 12 due to the current at the time of determining the degradation can be reduced.

It is noted that, in the process illustrated in FIG. 9, the degradation determination part 106 generates the information indicating the degradation state of the second solder 52 based on the measurement result of the second temperature sensor 42 obtained over a whole discharge period of the filter capacitor 22; however, this is not indispensable. For example, the degradation determination part 106 may generate the information indicating the degradation state of the second solder 52 based on the measurement result of the second temperature sensor 42 obtained over a part of the whole discharge period of the filter capacitor 22 or at a predetermined timing during the discharge period.

It is noted that the process illustrated in FIG. 9 may be performed independently from the process illustrated in FIG. 7; however, it is preferred that the process illustrated in FIG. 9 is performed after the process illustrated in FIG. 7. In this case, for example, when the determination result of step S702 illustrated in FIG. 7 becomes "YES", the process from step S901 illustrated in FIG. 9 is started. According to such a combination, the degradation determination part 106 can generate the information indicating the degradation states of the first solder 51 and the second solder 52 by utilizing a series of operations that are generally performed at the time of stopping the system related to the motor drive circuit 2.

Figure 11:
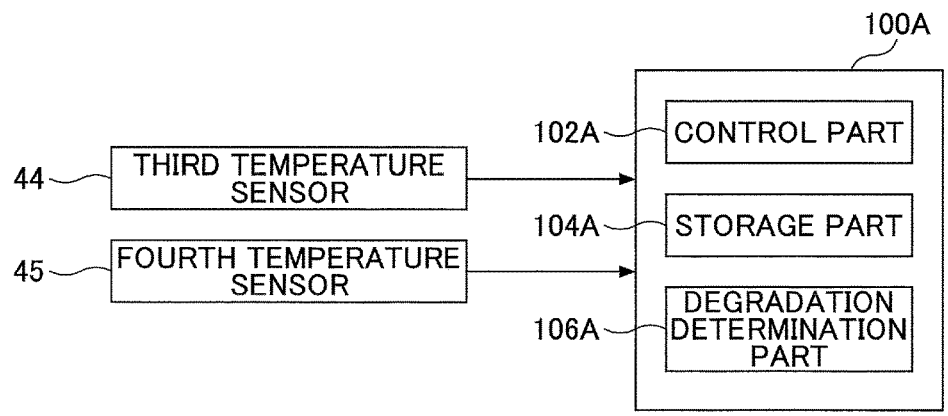
FIG. 11 is a diagram illustrating a configuration of an information processing system related to the solder degradation information generation apparatus according to the second embodiment.

Next, with reference to FIG. 11, the solder degradation information generation apparatus according to a second embodiment of the present invention is described. The motor drive circuit to which the solder degradation information generation apparatus according to the second embodiment is applied may be the same as the motor drive circuit 2 illustrated in FIG. 1. However, the motor drive circuit to which the solder degradation information generation apparatus according to the second embodiment is applied may be a configuration in which the converter 4 in the motor drive circuit 2 illustrated in FIG. 1 is omitted.

The solder degradation information generation apparatus according to the second embodiment differs from the solder degradation information generation apparatus 1 according to the first embodiment mainly in that the solder degradation information generation apparatus according to the second embodiment generates information indicating a degradation state of a solder immediately below a switching element related to the inverter 3.

Here, the switching element of a U-phase upper arm of the inverter 3 is referred to as "a third switching element 15", and the switching element of a W-phase lower arm of the inverter 3 is referred to as "a fourth switching element 16".

The third switching element 15 is installed on a third substrate (not illustrated) via a third solder (not illustrated), as is the case with the free wheeling diode 11 illustrated in FIG. 2. The third substrate is cooled by a third coolant as is the case with first substrate 60 illustrated in FIG. 2.

The fourth switching element 16 is installed on a fourth substrate (not illustrated) via a fourth solder (not illustrated), as is the case with the free wheeling diode 11 illustrated in FIG. 2. The fourth substrate is different from the third substrate and electrically insulated from the third substrate. The fourth substrate is cooled by a fourth coolant as is the case with first substrate 60 illustrated in FIG. 2. The fourth coolant may be the same as the third coolant (i.e., a shared coolant) or may be different from the third coolant (i.e., the fourth coolant and the third coolant flow in separated channels).

FIG. 11 is a diagram illustrating a configuration of an information processing system related to the solder degradation information generation apparatus according to the second embodiment.

The solder degradation information generation apparatus 1A includes a processing device 100A, a third temperature sensor 44 and a fourth temperature sensor 45.

The processing device 100A includes a computer.

The third temperature sensor 44 (an example of a third measuring unit) measures a temperature of the third switching element 15. The third temperature sensor 44 may be incorporated in a chip that includes the third switching element 15.

The fourth temperature sensor 45 (an example of a fourth measuring unit) measures a temperature of the fourth switching element 16. The fourth temperature sensor 45 may be incorporated in a chip that includes the fourth switching element 16.

The processing device 100A includes a control part 102A, a storage part 104A, and a degradation determination part 106A.

The control part 102A controls the inverter 3 by applying pulses to respective gates of the respective switching elements (including the third switching element 15 and the fourth switching element 16) of the inverter 3. Further, the control part 102A controls the main switch SW1 (FIG. 1).

The storage part 104A stores the measurement results of the third temperature sensor 44 and the fourth temperature sensor 45.

The degradation determination part 106A outputs information indicating degradation states of the third solder and the fourth solder based on change manners of the measured values of the third temperature sensor 44 and the fourth temperature sensor 45. The information indicating the degradation states of the third solder and the fourth solder may be the same as described above in connection with the first embodiment. A way of determining the degradations of the third solder and the fourth solder may be the same as the way described above in connection with the first embodiment.

Figure 12:
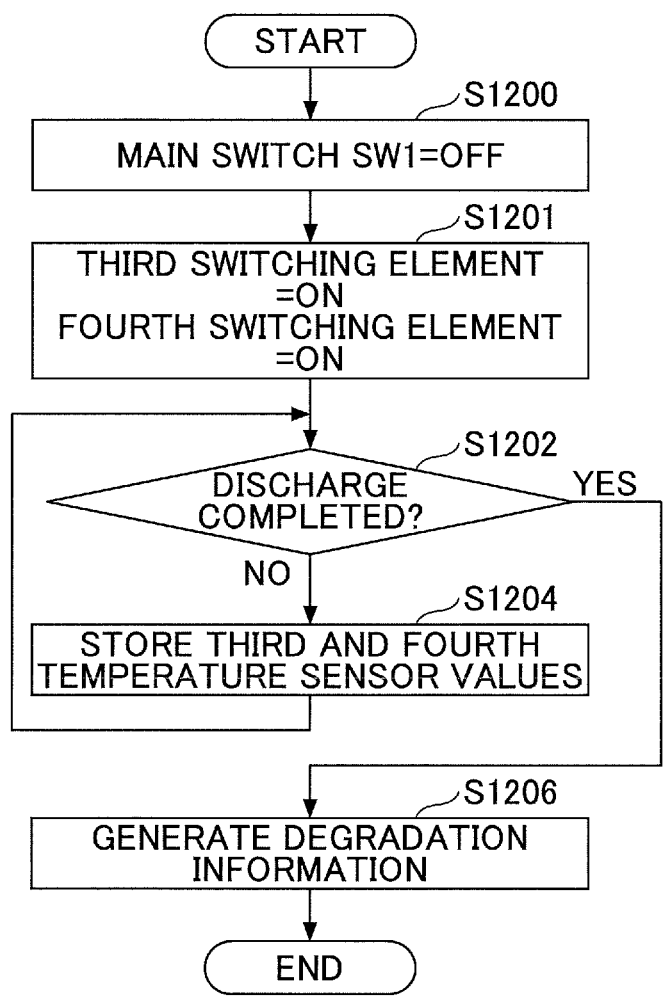
FIG. 12 is an example of a flowchart of a solder degradation determination process executed by a processing device 100A.

FIG. 12 is an example of a flowchart of the solder degradation determination process executed by the processing device 100A.

In step S1200, the control part 102A turns off the main switch SW1. When the main switch SW1 is turned off, the system related to the motor drive circuit 2 is stopped.

In step S1201, the control part 102A turns on the third switching element 15 and turns on the fourth switching element 16. In other words, the control part 102A turns on the third switching element 15 and the fourth switching element 16 simultaneously. It is noted that, at that time, the control part 102A turns off other switching elements of the inverter 3, and turns off the first switching element 10 of the converter 4 if the converter 4 is provided. As a result of this, the current flows as schematically illustrated by an arrow 14 in FIG. 13, which causes electric charges accumulated in the smoothing capacitor 20 to move to ground via the third switching element 15 and the fourth switching element 16. In other words, the smoothing capacitor 20 is discharged. Accordingly, the loss is generated at the third switching element 15 and the fourth switching element 16, which increases the temperatures of the third switching element 15 and the fourth switching element 16.

In step S1202, the control part 102A determines whether the discharging of the smoothing capacitor 20 is completed. The control part 102A may determine that discharging of the smoothing capacitor 20 is completed after a lapse of a predetermined time from the timing of starting the discharge. Alternatively, the control part 102A may determine that discharging of the smoothing capacitor 20 is completed when the voltage across the smoothing capacitor 20 becomes less than or equal to a predetermined threshold. If it is determined that the discharging of the smoothing capacitor 20 is completed, the process routine goes to step S1206, otherwise the process routine goes to step S1204. It is noted that, if it is determined that the discharging of the smoothing capacitor 20 is completed, the control part 102A may turn off the third switching element 15 and the fourth switching element 16.

In step S1204, the control part 102A stores the measured values of the third temperature sensor 44 and the fourth temperature sensor 45 at that time in the storage part 104A. When the control part 102A completes the process of step S1204, the control part 102A performs the processes from step S1202 after a lapse of a predetermined time again.

In step S1206, the control part 102A generates, based on the measurement results of the third temperature sensor 44 and the fourth temperature sensor 45 (i.e., the measurement results of the third temperature sensor 44 and the fourth temperature sensor 45 during the discharging of the smoothing capacitor 20) stored in the storage part 104A, the information indicating the degradation states of the third solder immediately below the third switching element 15 and the fourth solder immediately below the fourth switching element 16. The process itself may be the same as the process in step S406 described above except that the measurement results of the third temperature sensor 44 and the fourth temperature sensor 45 are used and the degradation states of the third and fourth solders are determined.

Figure 13:
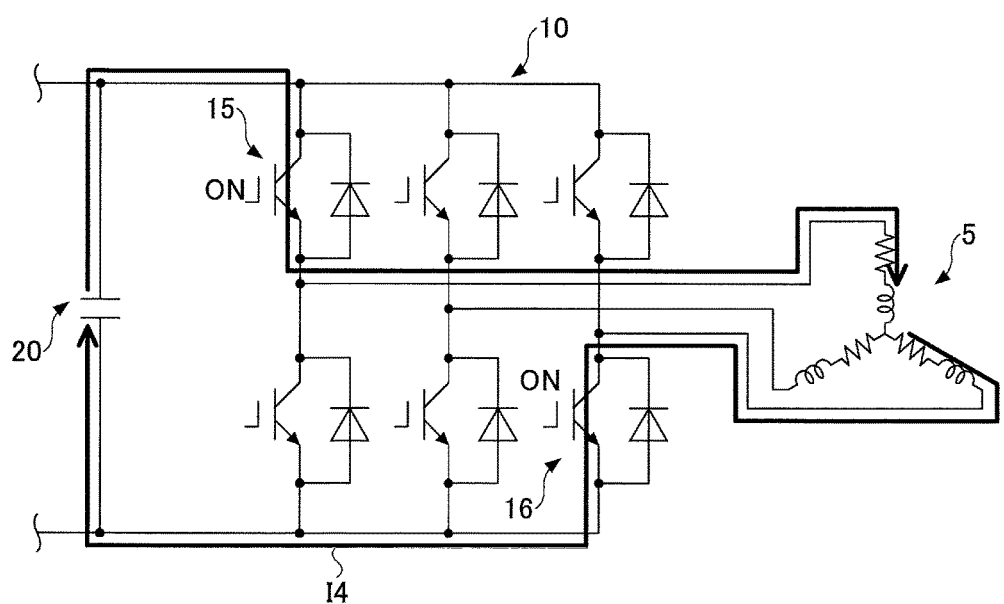
FIG. 13 is a diagram schematically illustrating flow of a current at a time of discharging the smoothing capacitor 20.

According to the process illustrated in FIG. 12, the degradation determination part 106A can generate, based on the measurement results of the third temperature sensor 44 and the fourth temperature sensor 45 during the discharging of the smoothing capacitor 20, the information indicating the degradation states of the third solder immediately below the third switching element 15 and the fourth solder immediately below the fourth switching element 16. Thus, the degradation determination part 106A can effectively generate the information indicating the degradation states of the third and fourth solders by utilizing a discharge operation that is generally performed at the time of stopping the system related to the motor drive circuit 2. Further, the current through the third switching element 15 and the fourth switching element 16 during the discharging of the smoothing capacitor 20 does not take an instantaneous large value, because there are inductances and resistors of the electric motor 5 in the circuit as illustrated in FIG. 13 (i.e., because a low impedance is prevented). Therefore, a probability of a failure of the third switching element 15 and the fourth switching element 16 due to the current at the time of determining the degradation can be reduced.

It is noted that, in the process illustrated in FIG. 12, the degradation determination part 106A generates the information indicating the degradation states of the third and fourth solders based on the measurement results of the third temperature sensor 44 and the fourth temperature sensor 45 obtained during the discharge period of the smoothing capacitor 20; however, this is not indispensable. For example, the degradation determination part 106A may generate the information indicating only one of the degradation states of the third and fourth solders based on the corresponding one of the measurement results of the third temperature sensor 44 and the fourth temperature sensor 45 obtained during the discharge period of the smoothing capacitor 20.

Further, according to the process illustrated in FIG. 12, as an example, the third switching element 15 is related to the U-phase upper arm of the inverter 3, and the fourth switching element 16 is related to the W-phase lower arm of the inverter 3; however, this is not indispensable. For example, the third switching element 15 may be related to the U-phase upper arm of the inverter 3, and the fourth switching element 16 may be related to the V-phase lower arm of the inverter 3. Similarly, the third switching element 15 may be related to the V-phase upper arm of the inverter 3, and the fourth switching element 16 may be related to the W-phase or U-phase lower arm of the inverter 3. Similarly, the third switching element 15 may be related to the W-phase upper arm of the inverter 3, and the fourth switching element 16 may be related to the V-phase or U-phase lower arm of the inverter 3. Further, the process illustrated in FIG. 12 may be performed in sequence for each pair of the switching elements according to these combinations. In this case, the degradation determination part 106A may generate the information indicating the degradation states of the solders related to the respective pairs by dividing the whole discharge period of the smoothing capacitor 20 into a plurality of time sections.

Further, in the process illustrated in FIG. 12, the degradation determination part 106A generates the information indicating the degradation states of the third and fourth solders based on the measurement results of the third temperature sensor and the fourth temperature sensor 45 obtained over a whole discharge period of the smoothing capacitor 20; however, this is not indispensable. For example, the degradation determination part 106A may generates the information indicating the degradation states of the third and fourth solders based on the measurement results of the third temperature sensor 44 and the fourth temperature sensor 45 obtained over a part of the whole discharge period of the smoothing capacitor 20 or at a predetermined timing during the discharge period.

The present invention is disclosed with reference to the preferred embodiments. However, it should be understood that the present invention is not limited to the above-described embodiments, and variations and modifications may be made without departing from the scope of the present invention.

For example, the motor drive circuit 2 illustrated in FIG. 2 does not include a heat radiating resistor; however, the heat radiating resistor may be provided in parallel with the smoothing capacitor 20. In the case where the heat radiating resistor is provided, the current flowing through the third switching element 15 and the fourth switching element 16 during the discharge period of the smoothing capacitor 20 may become smaller; however, the effects described above can be still obtained.

Further, the embodiments described above are related to the motor drive circuit 2 used for the hybrid vehicle or the electric vehicle; however, the embodiments described above can be applied to a motor drive circuit used for a power steering apparatus.

Further, in the embodiments described above, the information indicating the degradation states by utilizing the timing of starting up or stopping the system related to the motor drive circuit 2; however, if similar charge or discharge is performed at other timings, the information indicating the degradation states may be generated at such timings.

Further, according to the embodiments described above, a configuration in which only one side of the chip of the semiconductor element as illustrated in FIG. 2 is to be cooled is assumed; however, such a configuration in which both sides of the chip are to be cooled is also applicable. Such a configuration in which both sides of the chip are to be cooled may be such as disclosed in Japanese Laid-open Patent Publication No. 2012-235081, for example. For example, the chip of the semiconductor element (the chip of the free wheeling diode 11 in the example illustrated in FIG. 2, for example) is bonded to substrates (copper plates, for example) on the upper and lower sides via solders. In this case, the information indicating the degradation state of the solder can be generated similarly by regarding the solders on the upper and lower sides of the chip of the free wheeling diode 11 as a group (through it is not possible to identify which one is indicated by the information).

The present application is based on and claims benefit of priority of Japanese Priority Application No. 2014-237004, filed on Nov. 21, 2014, the entire contents of which are hereby incorporated by reference.

What is claimed is:
1. A solder degradation information generation apparatus related to a motor drive circuit that includes a power supply, a converter, a smoothing capacitor, and an electric motor, the solder degradation information generation apparatus comprising:
- a semiconductor element that forms an upper arm of the converter and is bonded to a substrate via a solder, the substrate being cooled by a coolant;
- a temperature sensor configured to measure a temperature of the semiconductor element; and
- a processing device that generates information indicating a degradation state of the solder based on a measurement result of the temperature sensor that is obtained during a period in which the smoothing capacitor is charged, wherein
- the processing device causes the smoothing capacitor to be charged at a time of starting up a system related to the motor drive circuit, and generates the information based on the measurement result of the temperature sensor obtained during the period in which the smoothing capacitor is thus charged.

2. The solder degradation information generation apparatus of claim 1, wherein
the semiconductor element includes a Free Wheeling Diode or an RC-IGBT (Reverse Conducting-Insulated Gate Bipolar Transistor).

3. A solder degradation information generation apparatus related to a motor drive circuit that includes a power supply, a filter capacitor, a converter, a smoothing capacitor, and an electric motor, the solder degradation information generation apparatus comprising:
- a first switching element that forms an upper arm of the converter and is bonded to a first substrate via a first solder, the first substrate being cooled by a first coolant;
- a second switching element that forms a lower arm of the converter and is bonded to a second substrate via a second solder, the second solder being different from the first solder, the first substrate being cooled by a second coolant;
- a first temperature sensor configured to measure a temperature of the first switching element; and
- a processing device that turns on the first switching element and turns off the second switching element to cause the smoothing capacitor to be discharged, and generates information indicating a degradation state of the first solder based on a measurement result of the first temperature sensor that is obtained during a period in which the smoothing capacitor is thus discharged, wherein
the processing device, at a time of shutting down a system related to the motor drive circuit, turns on the first switching element and turns off the second switching element to cause the smoothing capacitor to be discharged, and generates the information based on the measurement result of the first temperature sensor obtained during the period in which the smoothing capacitor is thus discharged.

4. The solder degradation information generation apparatus of claim 3, further comprising
a second temperature sensor configured to measure a temperature of the second switching element, wherein
the processing device, after the smoothing capacitor has been discharged, turns on the second switching element to cause the filter capacitor to be discharged, and generates information indicating a degradation state of the second solder based on the measurement result of the second temperature sensor obtained during the period in which the filter capacitor is thus discharged.

5. A solder degradation information generation apparatus related to a motor drive circuit that includes a power supply, a filter capacitor, a converter, a smoothing capacitor, and an electric motor, the solder degradation information generation apparatus comprising:
- a switching element that forms a lower arm of the converter and is bonded to a substrate via a solder, the substrate being cooled by a coolant;
- a temperature sensor configured to measure a temperature of the switching element; and
- a processing device that turns on the switching element to cause the filter capacitor to be discharged, and generates information indicating a degradation state of the solder based on a measurement result of the temperature sensor that is obtained during a period in which the filter capacitor is thus discharged, wherein
the processing device, at a time of starting up a system related to the motor drive circuit, turns on the switching element to cause the filter capacitor to be discharged and generates the information based on the measurement result of the temperature sensor obtained during the period in which the filter capacitor is thus discharged.

6. A solder degradation information generation apparatus related to a motor drive circuit that includes an inverter, a smoothing capacitor, and an electric motor, the solder degradation information generation apparatus comprising:
- a first switching element that forms an upper arm of the inverter related to a first phase and is bonded to a first substrate via a first solder, the first substrate being cooled by a first coolant;
- a second switching element that forms an upper arm of the inverter related to a second phase different from the first phase and is bonded to a second substrate via a second solder different from the first solder, the second substrate being cooled by a second coolant;
- a temperature sensor configured to measure a temperature of the first switching element or the second switching element; and
- a processing device that turns on the first switching element and the second switching element simultaneously to cause the smoothing capacitor to be discharged, and generates information indicating a degradation state of the first solder or the second solder based on a measurement result of the temperature sensor that is obtained during a period in which the smoothing capacitor is thus discharged, wherein
the processing device, at a time of shutting down a system related to the motor drive circuit, turns on the first switching element and the second switching element simultaneously to cause the smoothing capacitor to be discharged and generates the information based on the measurement result of the temperature sensor obtained during the period in which the smoothing capacitor is thus discharged.

* * * * *